US006045271A

United States Patent [19]

Shimoji et al.

[11] Patent Number: 6,045,271

[45] Date of Patent: Apr. 4, 2000

[54] FERRULE FOR OPTICAL CONNECTOR AND METHOD FOR MANUFACTURING OPTICAL CONNECTOR USING THE FERRULE

[75] Inventors: Naoko Shimoji, Ichihara; Jun Yamakawa, Chiba; Ken Kanai, Ichihara; Shinji Nagasawa, Mito, all of Japan

[73] Assignees: The Furukawa Electric Co. Ltd.; Nippon Telephone and Telegraph Corporation, both of Tokyo, Japan

[21] Appl. No.: 09/097,044

[22] Filed: Jun. 12, 1998

[30] Foreign Application Priority Data

Oct. 16, 1996 [JP] Japan .................................... 8-294595

[51] Int. Cl.[7] ........................................................ G02B 6/36

[52] U.S. Cl. ................................ 385/85; 385/55; 385/60; 385/70; 385/80

[58] Field of Search ................................ 385/85, 55, 59, 385/60, 70, 71, 72, 76, 80

[56] References Cited

U.S. PATENT DOCUMENTS

| | | | |
|---|---|---|---|
| 5,631,985 | 5/1997 | Yamada et al. | 385/59 |
| 5,631,986 | 5/1997 | Frey et al. | 385/85 X |
| 5,673,347 | 9/1997 | Pitassa | 385/70 |

FOREIGN PATENT DOCUMENTS

| | | |
|---|---|---|
| 59-38707 | 3/1984 | Japan . |
| 4-57804 | 5/1992 | Japan . |
| 6-242348 | 9/1994 | Japan . |
| 7-63955 | 3/1995 | Japan . |

*Primary Examiner*—Phan T. H. Palmer

*Attorney, Agent, or Firm*—Lacasse & Associates; Randy W. Lacasse; Wesley L. Strickland

[57] ABSTRACT

A ferrule for an optical connector wherein the work efficiency of the manufacture is increased by reducing the time necessary for grinding and the reliability of the connection of the optical connectors is improved. A front end surface (2) of a ferrule (1) comprises a flat surface (16) vertical to the central axes of optical fiber insertion holes (3) and a slanting surface (15). A step (17) is provided at the upper end of a slanting surface (15) and the flat surface (16) protrudes frontward by the step (17) with respect to the slanting surface (15). The optical fiber insertion holes (3) open at the slanting surface (16) and pin engagement holes (4) are provided on both sides of the optical fiber insertion holes (3).

2 Claims, 2 Drawing Sheets

FERRULE FOR OPTICAL CONNECTOR AND METHOD FOR MANUFACTURING OPTICAL CONNECTOR USING THE FERRULE

TECHNICAL FIELD

The present invention relates to a ferrule for an optical connector and a method for manufacturing an optical connector by use of the ferrule.

BACKGROUND ART

FIGS. 3*a* and 3*b* show an example of the structure of a conventional ferrule for an optical connector. In the figure, a ferrule 1 formed by molding thermosetting resin such as epoxy has a flat square shape and a front end surface 2 thereof is a flat surface. At the front end surface 2, a plurality of optical fiber insertion holes 3 are formed so as to be aligned in the horizontal direction, and pin engagement holes 4 are formed on the left and right sides of the optical fiber insertion holes 3 so as to sandwich the optical fiber insertion holes 3.

As shown in FIG. 3*b*, the optical fiber insertion holes 3 are formed so as to pass through the ferrule 1 from the rear end side to the front end surface 2. The front end sides of the optical fiber insertion holes 3 are fine holes so that optical fibers (bare optical fibers) are inserted therein without shaking. The openings of the optical fiber insertion holes 3 are rather wide in the vertical direction at the rear end side so that the coated portions of optical fiber cored lines may be inserted therein.

In the middle of each optical fiber insertion hole 3, an adhesive pouring hole 6 is formed. For ease of understanding, in FIG. 3*b*, the hole portion of the optical fiber insertion hole 3 through which a bare optical fiber is inserted is drawn so as to have a diameter greater than the actual diameter.

In manufacturing an optical connector by use of the ferrule 1, for example, an end portion of a multi-cored optical fiber line such as an optical fiber ribbon is stripped to remove the coated portion so that the bare fiber is exposed and under this condition, the multi-cored optical fiber line is inserted into the optical fiber insertion hole 3 from the rear end side of the ferrule 1 so that the bare fiber of each core is passed through the optical insertion hole 3 and protrudes out of the front end surface 2. Then, by pouring an adhesive into the adhesive pouring hole 6, the adhesive enters the optical fiber insertion hole 3, so that the optical fiber is secured by the adhesive in the optical fiber insertion hole 3. At this time, an adhesive 7 entering the optical fiber insertion hole 3 is hardened seeping out of the front end surface 2 of the ferrule 1 as shown in FIG. 4.

Under this condition, first, the front end surface 2 is ground so as to be flat, i.e. flat grinding of the front end surface 2 is performed, so that a bare optical fiber 8, an adhesive 7 and a portion A of the front end surface of the ferrule 1 shown in FIG. 4 are ground. Then, a portion B is obliquely ground, and the bare optical fiber 8 of the multi-cored optical fiber line is exposed out of a slanting surface 10. By the oblique grinding, the manufacture of an optical connector is completed.

In connecting optical connectors, a pin is inserted into the pin engagement hole 4 in the front end surface (connection end surface) of an optical connector and by inserting the ferrule of another optical connector from the other end side of the pin, the optical connectors to be connected to each other are aligned. Thereby, the optical fiber of one optical connector and the corresponding optical fiber of the other optical connector are brought in contact with each other so as to be opposed to each other with their axes coinciding with each other. The connector connection of the optical fibers is thus achieved.

The oblique grinding of the ferrule 1 is performed in order to reduce the connection loss by preventing the influence of reflected light of the connected end surface of the optical fiber by forming to be slanting the surface of the bare optical fiber 8 exposed out of the connected end surface.

However, in the conventional ferrule 1, since the front end surface is a flat surface vertical to the central axes of the optical fiber insertion holes 3, it is always necessary to perform the flat grinding for surely removing the portion of the adhesive 7 hardened seeping out of the front end surface 2. In addition, since it is necessary to perform the oblique grinding after the flat grinding, the number of grinding steps increases and since both the flat grinding and the oblique grinding are performed, the amount of grinding increases, so that the time required for grinding increases. This stands in the way of increasing the work efficiency of the grinding.

While the pin insertion holes 4 and the optical fiber insertion holes 3 are designed so as to be parallel to one another, in actually forming them, these holes tend to incline. Even when there is an inclination of the holes, in the molded products, the relative position distance between the pin engagement holes 4 and the optical fiber insertion holes 3 are accurately positioned on the side of the front end surface 2 of the ferrule 1. However, the amount of deviation between the relative positions of the holes increases from the front end surface 2 to the inside of the ferrule 1.

In grinding the conventional ferrule 1, as shown in FIG. 4, on the central axis of the bare optical fiber 8, in the first flat grinding, the front end surface 2 of the ferrule 1 is ground away by a thickness $d_A$, and in the subsequently-performed oblique grinding, the front end surface 2 is further ground away by a thickness $d_B$, so that on the central axis of the bare optical fiber 8, the front end surface 2 of the ferrule 1 is ground away by as much as a thickness of $D_0$ ($D_0=d_A+d_B$) as a whole. For this reason, when the optical fiber insertion holes 3 slightly incline and when the pin engagement holes 4 slightly incline, the amount of deviation between the positions of the holes 3 and 4 increases as the amount of grinding of the ferrule 1 in the direction of the thickness increases, so that the connection characteristics of the optical connectors degrade.

The present invention is intended for solving the above-mentioned themes, and an object thereof is to provide a ferrule for an optical connector and a method for manufacturing an optical connector by use of the ferrule wherein the number of grinding steps and the amount of grinding of the ferrule are decreased, the work efficiency of the manufacture is increased and an optical connector being excellent in connection characteristics is obtained.

DISCLOSURE OF THE INVENTION

To achieve the above-mentioned object, the present invention takes the measures described below. The invention of a ferrule for an optical connector has the following features as measures for solving the theme: Optical fiber insertion holes and pin engagement holes are opened at a front end surface, said pin engagement holes being provided substantially on left and right sides of said optical fiber insertion holes so as to sandwich said optical fiber insertion holes, a portion of an end surface including openings of said optical fiber insertion holes comprises a slanting surface inclined toward a rear side from an upper end side to a lower end side, an upper side of said slanting surface where the optical fiber insertion holes open comprises a protruding surface protruding frontward through a step, and said protruding surface comprises a flat surface vertical to central axes of said optical fiber insertion holes.

The invention of a method for manufacturing an optical connector has the following features as measures for solving the theme: Optical fibers are inserted through said optical fiber insertion holes of said ferrule having the above-described features of the invention from the rear side so as to be exposed out of said slanting surface, said inserted optical fibers are bonded by use of an adhesive poured in the optical fiber insertion holes, then, the front end surface of said ferrule is started to be ground in a direction of inclination of said slanting surface, said step on the upper side of said slanting surface is ground away and said slanting surface together with said end surfaces of said optical fibers is finished by grinding.

According to the present invention, since the front end surface of the ferrule comprises the slanting surface and the flat surface, the flat surface is a protruding surface protruding frontward through the step with respect to the slanting surface and the optical fiber insertion holes are formed at the slanting surface, when the optical fibers are inserted into the optical fiber insertion holes and secured with an adhesive, even if the adhesive enters the optical fiber insertion holes and seeping to the slanting surface, the seeping adhesive is blocked by the step and is prevented from entering the flat surface.

Consequently, when an optical connector is manufactured by use of the ferrule of the present invention, since it never occurs that the adhesive is hardened seeping to the flat surface, the grinding of the flat surface for removing the adhesive is unnecessary and only the grinding of the slanting surface is necessary, so that the number of grinding steps is reduced and the amount of grinding is reduced. This reduces the time necessary for grinding. As a result, the work efficiency of the grinding is greatly improved.

In addition, since the amount of grinding is reduced, the grinding width in the direction of the depth is naturally reduced. Consequently, even if the optical fiber insertion holes and the pin engagement holes are formed so as to slightly incline in molding the ferrule, the amount of deviation between relative positions of the holes is small. This prevents the characteristics of the optical connector from greatly degrading. As a result, the reliability of the connection of the optical connectors is improved.

BEST MODE FOR CARRYING OUT THE INVENTION

Figure 1A:
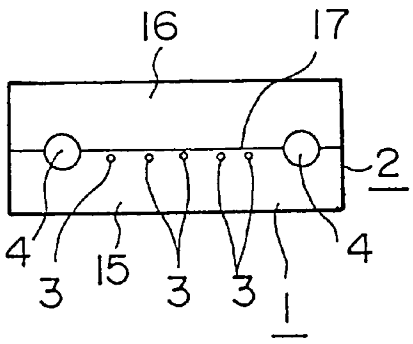
FIGS. 1*a* and 1*b* are views of assistance in explaining the structure of an embodiment of a ferrule of this present invention.
Figure 1B:
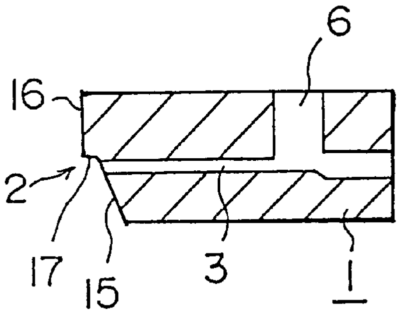

To describe the present invention in more detail, it will be explained with reference to the attached drawings. FIGS. 1*a* and 1*b* show the structure of a ferrule according to an embodiment of the present invention. In the description of this embodiment, portions the same as those of the prior art are denoted by the same reference numerals and no overlapping description will be given.

Features of the ferrule according to this embodiment are that the front end surface 2 of the ferrule 1 comprises a slanting surface 15 and a flat surface 16 vertical to the central axes of the optical fiber insertion holes 3, that a frontwardly protruding step 17 is provided at the upper end of the slanting surface 15 and that the flat surface 16 is a protruding surface frontwardly protruding with respect to the slanting surface 15. The structures of the other portions are the same as those of the prior art.

In this embodiment, the optical fiber insertion holes 3 are formed slightly below the step 17 so as to open at the slanting surface 15. The slanting surface 15 is, as shown in FIGS. 1*a* and 1*b*, a rightwardly slanting surface which inclines toward the rear side from the top to the bottom. The angle of the slanting surface 15 to the vertical surface is set at approximately 8 degrees at which the influence of the reflected light is minimum in connecting the optical fibers inserted into the optical insertion holes 3.

Moreover, in order to reduce the time required for the grinding performed thereafter, the protruding amount of the flat surface 16 from the upper end of the slanting surface 15 is preferably a minimum protruding amount necessary for preventing the seeping adhesive for bonding the optical fibers (bare optical fibers 8) housed in the optical fiber insertion holes 3 from entering the side of the flat surface 16.

To manufacture an optical connector by use of the ferrule 1 according to this embodiment, like in the prior art, an optical fiber cored line is inserted into the optical fiber insertion hole 3 from the rear end side of the ferrule so that the bare optical fiber 8 is passed through the optical fiber insertion hole 3 and is exposed out of the slanting surface 15, and under this condition, an adhesive is poured into the adhesive pouring hole 6 so as to enter the optical fiber insertion hole 3 to thereby secure the optical fiber to the ferrule 1.

Figure 2:
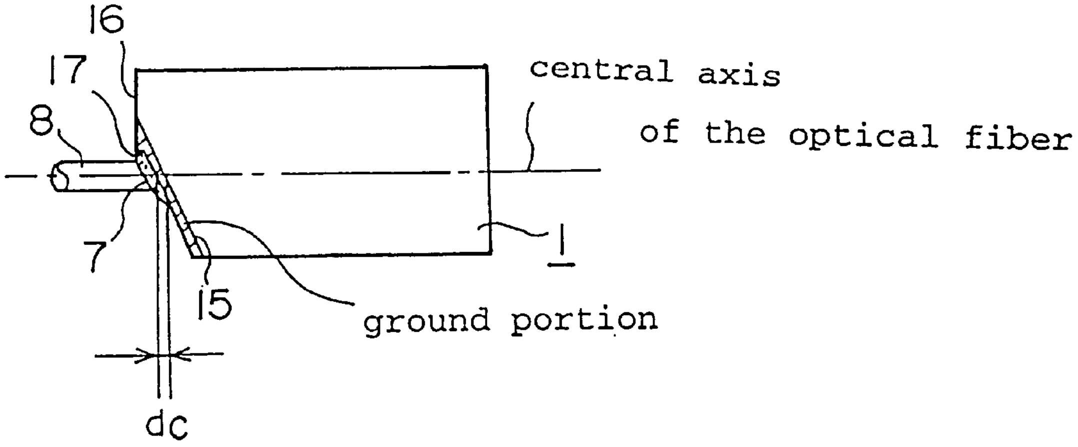
FIG. 2 is a view of assistance in explaining a method for manufacturing an optical connector by use of the ferrule of the present invention.
Figure 3A:
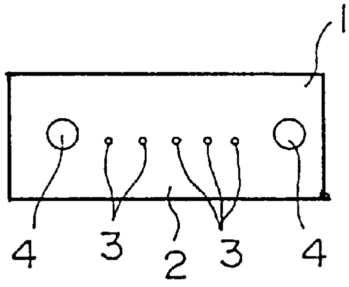
FIGS. 3*a* and 3*b* are views of assistance in explaining a conventional ferrule.
Figure 3B:
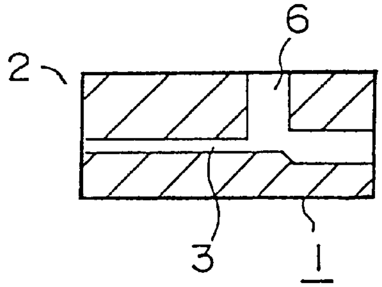
Figure 4:
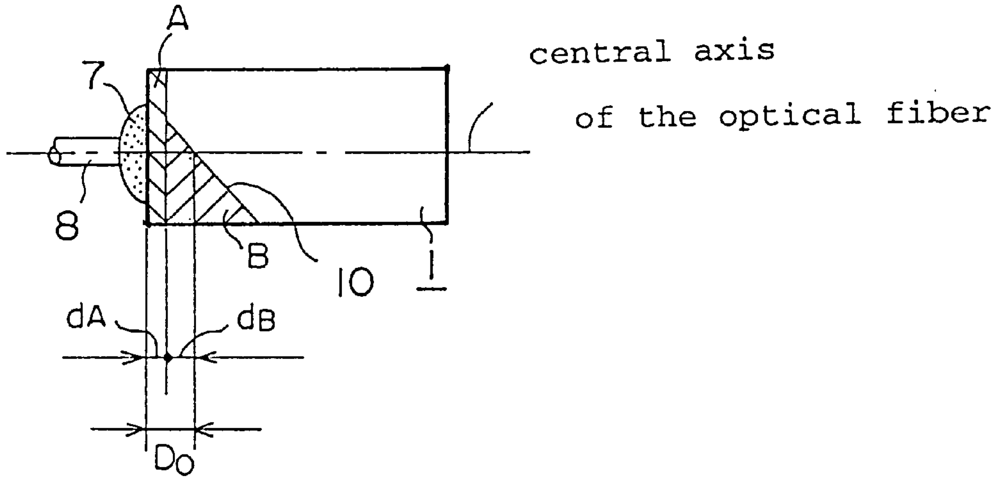
FIG. 4 is a view of assistance in explaining a method for manufacturing an optical connector by use of the conventional ferrule.

FIG. 2 shows the bonding condition of the bare optical fiber 8. The adhesive 7 seeping to the slanting surface 15 is blocked by the step 17 and hardened without seeping to the flat surface 16.

Then, the slanting surface 15 is ground in the direction of inclination of the slanting surface 15. By the grinding, the portion of the bare optical fiber 8 protruding out of the slanting surface 15, the portion of the adhesive 7 hardened seeping to the slanting surface 15 and the portion of the step 17 are removed. Then, grinding is further performed for a short period of time and grinding work is finished under a condition where the end portion of the bare optical fiber 8 is ground together with the slanting surface 15 to complete the manufacture of the optical connector.

In this embodiment, since the step 17 is interposed between the slanting surface 15 and the flat surface 16, even if the adhesive for bonding the optical fiber seeps out of the optical fiber insertion holes 3 to the slanting surface 15, the seeping adhesive is blocked by the step 17 and is prevented from entering the flat surface 16, so that it is unnecessary to perform the grinding of the flat surface 16 for removing the hardened adhesive which grinding is necessary in the prior art, and only the grinding of the slanting surface 15 is necessarily performed. Consequently, the number of grinding steps is smaller and the amount of grinding is smaller than in the prior art. This greatly reduces the time necessary for the grinding, so that the efficiency of the grinding is greatly increased.

The inventors compared the time necessary for the grinding between this embodiment and the prior art and verified that the grinding time in this embodiment is approximately 1/14 to that in the prior art or shorter.

In addition, since the amount of grinding is reduced as described above, as shown in FIG. 2, a ground-away portion $d_c$ in the direction of the depth on the central axis of the optical fiber is a small width of depth. Consequently, in molding the ferrule 1, even if the optical fiber insertion holes 3 and the pin engagement holes 4 are slightly inclined, since the depth of the ground-away portion is small, the amount of deviation between the relative positions of the holes is small. This solves the problem of the prior art that the amount of deviation between the relative positions of the holes increases because the ground-away portion is great. As a result, the reliability of the connection of the optical connectors is improved.

The present invention is not limited to the above-described embodiment but may have various embodiments.

Industial Applicability

As described above, the ferrule for an optical connector and the method for manufacturing an optical connecter by use of the ferrule according to the present invention are suitable for the manufacture of an optical connector of a type in which an end surface of the optical fiber exposed out of the connection end surface of the ferrule is obliquely ground together with the surface of the ferrule.

What is claimed is:

1. A ferrule for an optical connector, wherein optical fiber insertion holes and pin engagement holes are opened at a front end surface, said pin engagement holes being provided substantially on left and right sides of said optical fiber insertion holes so as to sandwich said optical fiber insertion holes, a portion of an end surface including openings of said optical fiber holes comprises a slanting surface inclined toward a rear side from an upper end side to a lower end side, an upper side of said slanting surface where the optical fiber insertion holes open comprises a protruding surface protruding frontward through a step, and said protruding surface comprises a flat surface vertical to central axes of said optical fiber insertion holes.

2. A method for manufacturing an optical connector, wherein optical fibers are inserted through said optical fiber insertion holes of said ferrule according to claim 1 from the rear side so as to be exposed out of said slanting surface, said inserted optical fibers are bonded by use of an adhesive poured in the optical fiber insertion holes, then, the front end surface of said ferrule is started to be ground in a direction of inclination of said slanting surface, said step on the upper side of said slanting surface is ground away and said slanting surface together with said end surfaces of said optical fibers is finished by grinding.

* * * * *

UNITED STATES PATENT AND TRADEMARK OFFICE

CERTIFICATE OF CORRECTION

PATENT NO. : 6,045,271
DATED : April 4, 2000
INVENTOR(S) : Shimoji et al.

It is certified that error appears in the above-identified patent and that said Letters Patent is hereby corrected as shown below:

The application has been filed claiming the benefit of Title 35 U.S.C. 120. As such, please insert in the front page the following priority claims of:

Appl. No: PCT/JP97/03690
Filed October 14, 1997.

Signed and Sealed this

Fifth Day of June, 2001

*Attest:*

Nicholas P. Godici

NICHOLAS P. GODICI

*Attesting Officer*

*Acting Director of the United States Patent and Trademark Office*